(12) United States Patent  
Cannella et al.

(10) Patent No.: US 9,273,600 B2
(45) Date of Patent: Mar. 1, 2016

(54) FUEL COMPOSITION (71) Applicants: William J. Cannella, Orinda, CA (US); Vittorio Manente, Scania (SE)

(72) Inventors: William J. Cannella, Orinda, CA (US); Vittorio Manente, Scania (SE)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/298,368

(22) Filed: Jun. 6, 2014

(65) Prior Publication Data

US 2014/0283778 A1 Sep. 25, 2014

Related U.S. Application Data (62) Division of application No. 12/913,036, filed on Oct. 27, 2010, now Pat. No. 8,747,491.

(60) Provisional application No. 61/256,819, filed on Oct. 30, 2009.

(51) Int. Cl.
| C10L 1/00 | (2006.01) |
| F02B 43/02 | (2006.01) |
| C10L 1/04 | (2006.01) |
| C10L 1/06 | (2006.01) |
| F02D 15/00 | (2006.01) |
| F02D 19/00 | (2006.01) |
| F02D 41/40 | (2006.01) |
| F02M 25/07 | (2006.01) |

(52) U.S. Cl.
CPC . *F02B 43/02* (2013.01); *C10L 1/04* (2013.01); *C10L 1/06* (2013.01); *C10L 2200/0407* (2013.01); *C10L 2270/026* (2013.01); *F02D 15/00* (2013.01); *F02D 19/00* (2013.01); *F02D 41/403* (2013.01); *F02M 25/07* (2013.01)

(58) Field of Classification Search
CPC ............. F02B 43/02; C10L 1/04; C10L 1/06; C10L 2200/0407; C10L 2270/026; F02D 15/00; F02D 19/00; F02D 41/403
See application file for complete search history.

(56) References Cited

U.S. PATENT DOCUMENTS

| 3,926,779 A | 12/1975 | Wilson et al. |
| 7,487,663 B2 * | 2/2009 | Sobotowski et al. ................. G01N 33/2817 73/35.02 |
| 2008/0289250 A1 | 11/2008 | Bazzani et al. |
| 2009/0151236 A1 | 6/2009 | Shibata |

(Continued)

FOREIGN PATENT DOCUMENTS

| JP | 2006077179 A | 3/2006 |
| JP | 2007291309 A | 11/2007 |

(Continued)

OTHER PUBLICATIONS

Kalghatgi, et al., Advantages of Fuels with High Resistance to Auto-Ignition in Late-Injection, Low-Temperature, Compression Ignition Combustion, 2006-01-3385, SAE Technical Paper Series, 2006.

(Continued)

*Primary Examiner* — Cephia D Toomer
(74) *Attorney, Agent, or Firm* — M. Carmen & Associates PLLC (57) ABSTRACT

A fuel composition having a boiling range of between 95 to 440 degrees Fahrenheit wherein the fuel composition has (a) a total sum of n-paraffins and naphthenes content of at least 7 volume percent.

10 Claims, 12 Drawing Sheets

Pilot Injection Amounts

(56) References Cited

U.S. PATENT DOCUMENTS

2010/0326410 A1 12/2010 Yeh et al.
2012/0012087 A1 1/2012 Cannella et al.

FOREIGN PATENT DOCUMENTS

| | | |
|---|---|---|
| JP | 2007291310 A | 11/2007 |
| JP | 2008031436 A | 2/2008 |
| WO | 2007113959 A1 | 10/2007 |
| WO | 2010109754 A1 | 9/2010 |

OTHER PUBLICATIONS

Kalghatgi, et al., Partially Pre-Mixed Auto-Ignition of Gasoline to Attain Low Smoke and Law NOx at High Load in a Compression Ignition Engine and Comparison with a Diesel Fuel, 2007-01-0006, SAE Technical Paper Series, 2007.

Leffler, W., Petroleum Refining, PennWell Cor., 2000, p.

Manente, et al., Partially Premixed Combustion at High Load using Gasoline and Ethanol, A Comparison with Diesel, 2009-01-0944, SAE Technical Paper Series, 2009.

Noehre, et al., Characterization of Partially Premixed Combustion, 2006-01-3412, SAE Technical Paper Series, 2006.

Kalghatgi, et al., Combustion limits and Efficiency in a Homogeneous Charge Compression ignition Engine, International Journal of Engine Research, Professional Engineering Publishing, GB, vol. 7, No. 3 (Jan. 1, 2006), pp. 215-236.

* cited by examiner

Figure 2:
Engine Boost Pressures

Figure 3:
Inlet Temperatures

Figure 4:
Exhaust Gas Recycle (EGR) Levels

Figure 5:
Engine Efficiencies

Figure 6:
Combustion Efficiencies

Figure 7:
NOx Emissions

Figure 8:
CO Emissions

Figure 9:
Hydrocarbon Emissions

Figure 10:
Soot Levels

Figure 11:
Maximum Pressure Rise Rates

Figure 12:
Correlation of Maximum Pressure Rise Rate to Fuel Composition

FUEL COMPOSITION

PRIORITY

This application is a divisional of co-pending U.S. patent application Ser. No. 12/913,036 filed Oct. 27, 2010, which claims the benefit of U.S. Provisional Application Ser. No. 61/256,819, filed Oct. 30, 2009, the contents of which are incorporated herein by reference.

FIELD OF THE INVENTION

The present invention relates to fuel compositions that yield very low soot and low $NO_x$ emissions while having high efficiencies and acceptable maximum in-cylinder pressure rise rates over a wide load range when used in an advanced combustion engine environment, especially one operating in partially-premixed combustion (PPC) mode.

BACKGROUND OF THE INVENTION

Continued global emphasis and government legislation on reducing emissions and improving fuel economy of internal combustion engines has led to the need to develop advanced high efficiency, clean combustion engines. Exhaust after-treatment systems (such as Selective Catalyst Reduction (SCR), lean $NO_x$ traps, and diesel particulate filters) have been designed and commercialized to lower exhaust emissions to meet emission targets and regulations. However, these systems are costly, add to the weight of the vehicle, and minimize fuel economy due to the added weight and the need to use fuel to regenerate the systems. Reducing engine-out emissions would decrease the size and/or eliminate the need for these systems. Worldwide, a large R&D effort is underway at a multitude of industrial, government, and academic organizations to identify engine designs, operating conditions, and fuel compositions to accomplish that objective. One advanced combustion approach being considered is Homogeneous Charge Compression Ignition (HCCI) in which fuel is injected very early into the engine to enable a homogeneous mixture of air and fuel to be obtained prior to the start of combustion initiated through compression ignition. One significant drawback to that approach is that it is difficult to control the combustion process and high pressure rise; and, furthermore, heat release rates occur resulting in unacceptably high noise levels and potential engine damage. Thus, currently the operating speed-load range where acceptable performance can be obtained is very limited.

Another approach to optimize engine designs, operating conditions and fuel compositions is to employ fuels in a Partially Premixed Combustion (PPC) environment. In PPC settings, fuel injection timing is closer to top dead center and so the air and fuel are not completely mixed prior to combustion. By applying this strategy with high rates of cooled exhaust gas recirculation/recycle (EGR), the combustion event occurs and results in low soot and low $NO_x$. As compared to Homogeneous Charge Compression Ignition (HCCI), the control of the combustion in a PPC engine environment is re-gained along with the potential to reduce the rate of heat release and the maximum pressure rise rate.

Partially premixed combustion has been known to potentially reduce $NO_x$ and soot for diesel engines. However, to this point, specific fuel compositions have not been developed to obtain the best synergy among the fuel mixture, partially premixed combustion and reduction in $NO_x$ and soot.

We have discovered that specific gasoline fuel compositions having research octane numbers from about 69 to about 99 can have high gross efficiencies exceeding 50% and enable operation over a wide load range (up to or exceeding 18 bar gross IMEP) and provides significant reductions in NOx and soot when used in a PPC-type mode in compression ignition engine environment. Further, within the gasoline boiling range, fuel properties and certain fuel composition have been found to significantly influence the pressure rise rate; and engine performance fuel compositions have been found which lead to acceptable values. Best overall performance was achieved with fuels having a sum total n-paraffins plus naphthenes content greater than 7 volume %.

DESCRIPTION OF THE RELATED ART

In 1998 Nissan produced a limited number of diesel-fueled vehicles using a PPC-type approach that they called MK-combustion. However, the operating range where PPC operation worked satisfactorily was very limited and the production of those engines was discontinued.

Recently Noehre et al. (SAE paper 2006-01-3412) achieved relatively low NOx and soot using diesel fuel in a Scania D12 diesel engine operating under PPC-type mode. However, to achieve a moderate-to-high load of 15 bar IMEP, it was necessary to use a practically unrealistic high level of EGR (approximately 70%), a high boost pressure of 4.0 bar, and a relatively low compression ratio of 12:1. As a result of the compression ratio, engine efficiency was penalized.

More recently, Kalghatgi et al. (SAE papers 2006-01-3385 and 2007-01-0006) proposed using high octane gasoline in PPC-type operation to lower soot levels. In those studies in a Scania D12 heavy duty CI engine with a compression ratio of 14:1, they only tested a premium gasoline with a RON of 94.7. Hydrocarbon and CO levels were relatively high with values above 2 g/kWhr.

Similarly, Manente et al. (SAE paper 2009-01-0944) tested a premium gasoline (RON of 98) in a Scania D12 heavy duty CI engine and obtained gross specific efficiencies up to 45%, which was equivalent to that for diesel fuel. NOx levels were lower than for diesel fuel, but still at a level of about 0.7 g/kwhr which exceeds that Euro VI and US 2010 regulatory limits and thus would still require a NOx exhaust after treatment system. Hydrocarbon and CO levels were also high at levels of about 0.5 and 6.0 g/kWhr, respectively. At the start of the paper Manente et. al state that that work "demonstrates that the best fuel for a Compression Ignition engine has to be with high Octane Number."

Although researchers such as Kalghatgi et al. and Manente et. al have demonstrated that premium gasoline can provide lower NOx and soot levels than diesel fuel in PPC-type operation, fuel having an octane number as high as premium gasoline may not be the optimal fuel that permits sufficient expansion of the speed-load operating range to enable full-time operation. Furthermore, fuel chemistry and composition may be an important parameter for optimal performance rather than octane number.

SUMMARY OF THE INVENTION

In one embodiment, the present invention is directed to fuel compositions that enable better performance and wider speed-load operating ranges in advanced combustion engines, especially compression ignition engines operated in partially premixed combustion mode.

In one embodiment, the present invention is directed to a fuel composition having a boiling range of between 95 to 440 degrees Fahrenheit wherein the fuel composition has (a) a total sum of n-paraffins and naphthenes content of at least 7 volume percent and (b) a RON of about 93 or less, wherein the fuel is employed in an advanced combustion engine.

In one embodiment, the present invention is directed to a method of operating an internal combustion engine comprising, i. employing a fuel composition in an internal combustion engine, wherein the fuel composition has (a) a boiling range of between 95 to 440 degrees Fahrenheit, wherein the fuel composition has (b) total sum of n-paraffins and naphthenes content of 7 volume percent or higher and (c) wherein in the RON is about 93 or less;

ii. operating the internal combustion engine, wherein the compression ratio is from about 16:1 to about 20:1 and wherein the internal combustion engine is operated under partially premixed combustion conditions;

iii. wherein the fuel composition is employed at a load of at least up to 18 bar gross IMEP and engine out NOx emissions are no more than 0.35 grams/kilowatt-hr; (0.3 grams/kilowatt-hr); and iv. wherein the exhaust gas recirculation rate is less than 60 volume percent.

We have discovered fuel compositions that enable very high efficiencies exceeding 50%; very low NOx levels below 0.3 g/kWhr; acceptable in cylinder maximum rates of pressure rise of 15 bar/CAD or lower and acceptable soot levels.

DETAILED DESCRIPTION OF THE INVENTION

While the invention is susceptible to various modifications and alternative forms, specific embodiments thereof are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DEFINITIONS

RON—The Research Octane Number is measured in a specially designed single cylinder CFR engine at an engine speed of 600 rpm and a specified intake air temperature that depends on barometric pressure. It reportedly simulates fuel performance under low severity engine operation.

MON—The Motor Octane Number is measured in a specially designed single cylinder CFR engine at an engine speed of 900 rpm and an intake air temperature of 100 F. It reportedly simulates more severe operation that might be incurred at high speed or high load. In practice the octane of a gasoline is frequently reported as the average of RON and MON or R+M/2.

Fuel Composition

One embodiment of the present invention is directed to fuel compositions that provide: (a) a significant reduction in $NO_x$, (b) a reduction in soot emissions, and (c) high efficiencies, especially when compared to conventional diesel fuel compositions and premium gasoline (RON>94), when the fuels of the present invention are employed in a partially premixed combustion mode in an advanced combustion engine. Preferably, the fuel composition is a gasoline-type fuel composition that is employed in a diesel-type engine under partially premixed combustion conditions.

Furthermore, for certain fuel compositions of the present invention, reasonable maximum pressure rise rates are obtained, thus significantly expanding the range where the engine can be run under advanced combustion conditions satisfactorily.

The fuel composition employed in one embodiment of the present invention has a total sum of n-paraffins and naphthenes of at least 7 volume percent.

In one embodiment the fuel composition preferably has a RON of about 93 or less and a total sum of n-paraffins and naphthenes of at least 7 volume percent. More preferred, the fuel composition has a RON of about 90 or less and a total sum of n-paraffins and naphthenes of at least 15 volume percent.

Method of Making the Fuel Composition

The fuels employed in the presently claimed invention were taken from a commercial refinery and in some cases n-heptane or ethanol was added. Information about typical processes and conditions for making these fuels can be found in "Petroleum Refining" by William Leffler (PennWell Corp, 2000).

Engine Conditions

The fuel of the present invention was employed in an advanced engine combustion environment. Such combustion environments typically result in fuels that have been combusted and produce ultra low $NO_x$ emissions (e.g., less than 0.35 grams/kilowatt-hr) or produce low soot (e.g., FSN less than 5) or both. In addition to producing low NOx emissions or low soot or both, these fuels are employed in an engine environment as described below.

Preferably, the engine load was up to about at least 18 bar gross indicated mean effective pressure (IMEP). More preferred, the engine load was up to about 16 bar gross IMEP.

Furthermore, in one embodiment of the present invention, the aforementioned fuel composition is employed in an internal combustion engine and when the engine load is up to at least 12 bar gross IMEP, then preferably the engine out $NO_x$ levels are no more than 0.35 grams/kilowatt-hr. More preferred, when the engine load is up to at least about 12 bar gross IMEP, then the engine out $NO_x$ levels are no more than 0.3 grams/kilowatt-hr.

Furthermore, in one embodiment of the present invention, the aforementioned fuel composition is employed in an internal combustion engine having a compression ratio of from about 16:1 to about 20:1. More preferred, the compression ratio is from about 17:1 to 19:1. Most preferred, the compression ratio is 18:1.

In one embodiment of the present invention, the aforementioned fuel composition is employed in an internal combustion engine that preferably has an exhaust gas recirculation rate that is less than 60 volume percent. More preferred, the exhaust gas recirculation rate is less than 55 volume percent.

In one embodiment, the aforementioned fuel composition is employed in an internal combustion engine that preferably has a maximum pressure rise rate of less than about 15 bar/crank angle degree (CAD). More preferred, the maximum pressure rise rate is less than about 13 bar/CAD.

The following examples are presented to illustrate specific embodiments of this invention and are not to be construed in any way as limiting the scope of the invention.

EXAMPLES

Engine Parameters and Operating Conditions

The engine used during the experiments was a heavy duty single cylinder compression ignition engine, Scania D12. The cylinder head was flat and the piston used was shallow bowl type. The geometrical properties can be found in Table 1. The engine was boosted by using compressed air from an external air line; the inlet pressure was adjusted by using a waste gate valve. A heater (from Leister) placed before the inlet manifold, was used to heat up the air at the desired inlet temperature.

TABLE 1

Geometrical Properties of the Scania D12 Engine

| | |
|---|---|
| Displaced volume | 1966 [cm3] |
| Stroke | 154 [mm] |
| Bore | 127.5 [mm] |
| Connecting Rod | 255 [mm] |
| Compression ratio | 18:1 |
| Swirl Ratio | 2.9 [—] |

The engine was run by performing a load sweep between 1-12 bar gross IMEP at speeds of 100 and 1300 rpm.

The Scania D12 engine was equipped with an early generation common rail injection system from Bosch. The commercial nozzle was replaced with one that had an umbrella angle of 120°. The nozzle had 8 orifices; the diameter of the orifices was 0.18 mm. The fuel flow was measured by using a gravity scale with two digits precision from Sartorius and each operative point was sampled for at least two minutes.

Figure 1:
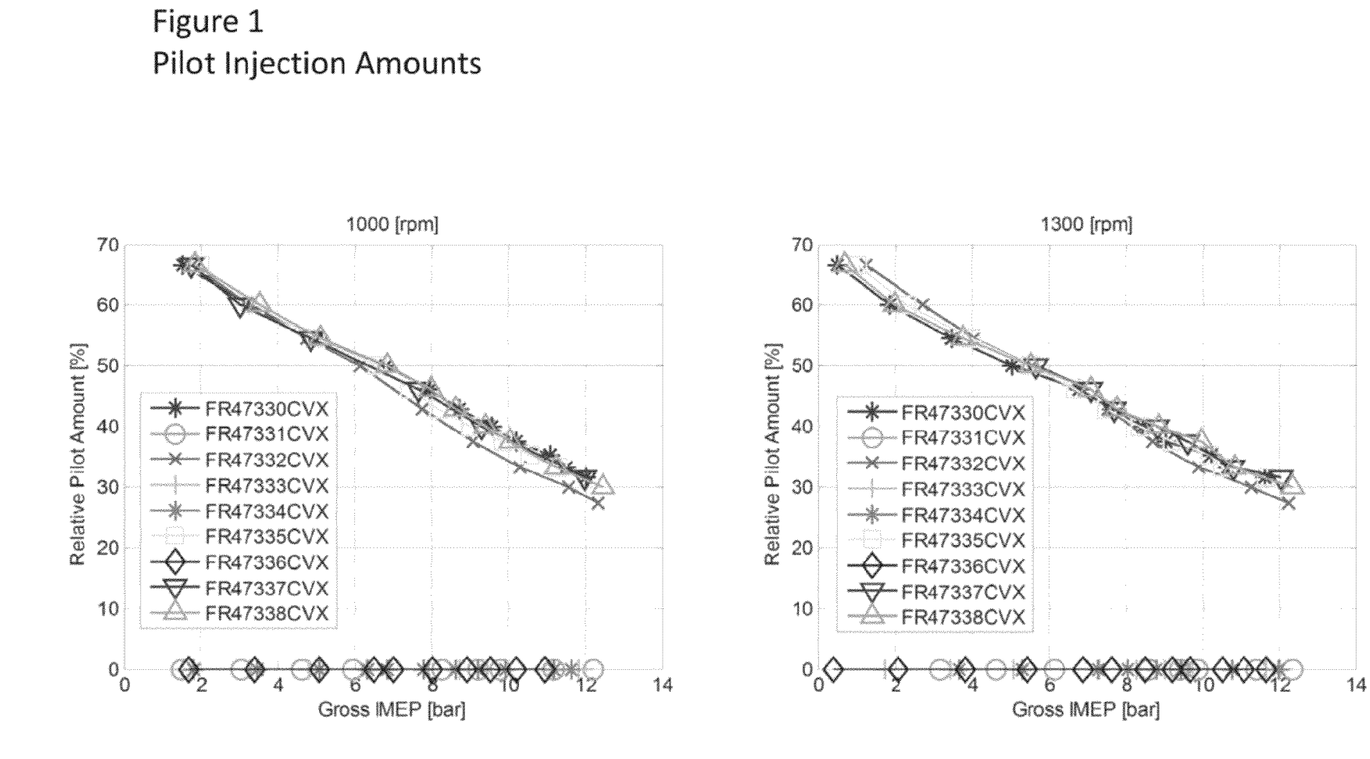
FIG. 1 depicts the percentage of total fuel injected in the pilot injection.
Figure 2:
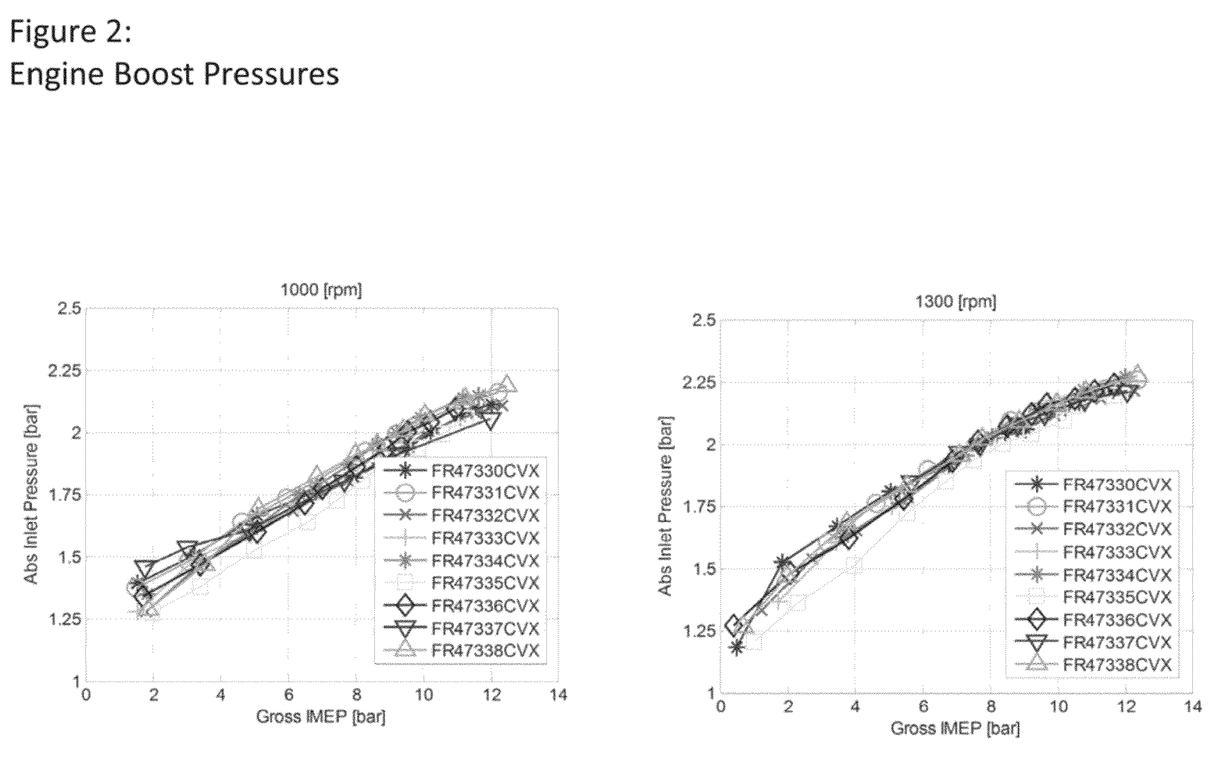
FIG. 2 depicts the engine boost pressures used.
Figure 3:
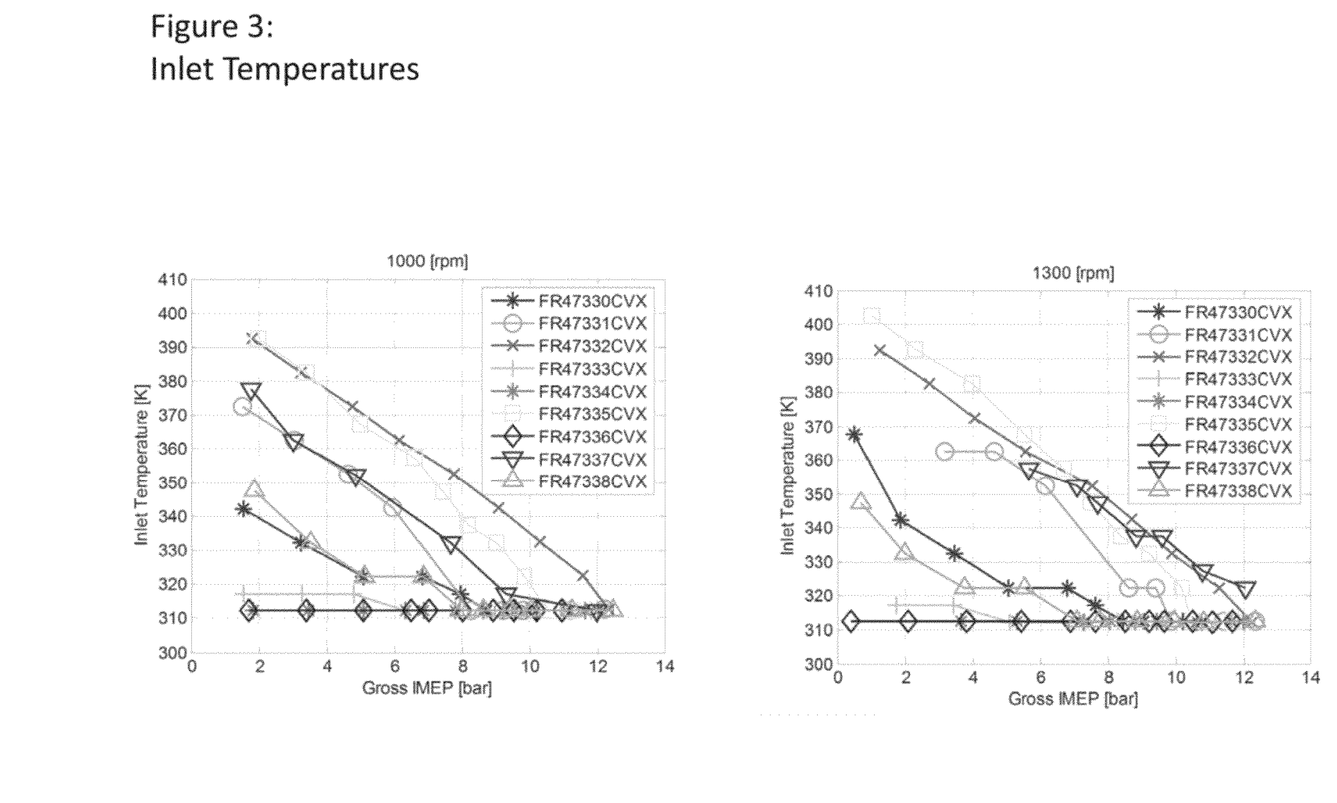
FIG. 3 depicts the inlet temperatures of the air injected into the combustion chamber.
Figure 4:
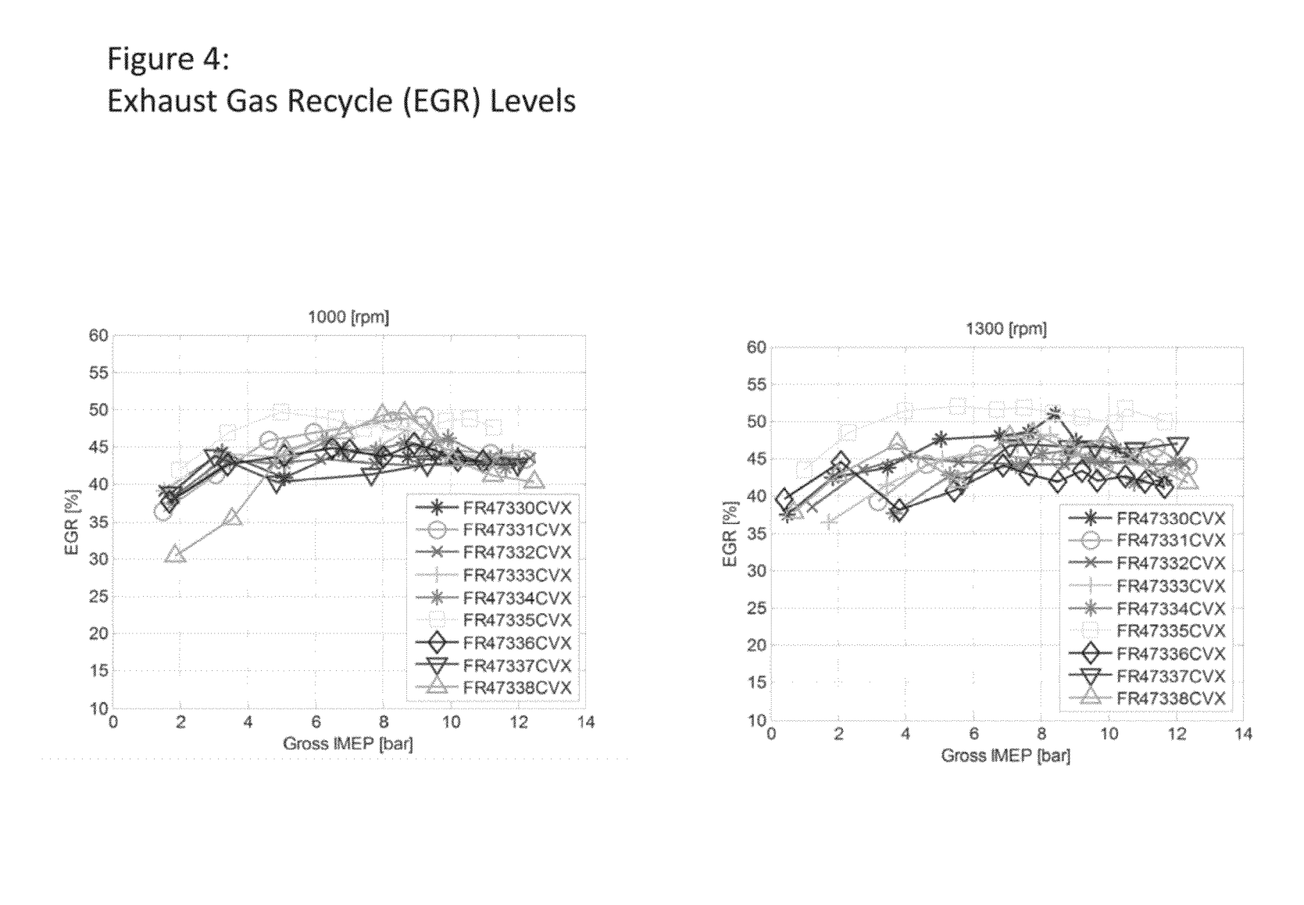
FIG. 4 depicts the Exhaust Gas Recycle (EGR) levels that were used.

The injection strategy consisted of using one or two fuel injection points to inject the fuel or ethanol into the combustion chamber of the engine. When used, the first or pilot injection point was placed very early in the compression stroke cycle to create a homogeneous mixture while the second point was injected near top-dead center to trigger the combustion event. The fuel amount in the pilot injection is independent of the load; and, it is only a function of compression ratio, fuel reactivity, and EGR level. When used, the pilot injection always occurred at −60 top dead center (TDC). As the load was increased, the pilot injection amount was decreased. The percentage of total fuel injected in the pilot injection is shown in FIG. 1. The inlet pressure was adjusted with load, with values of boost pressure from 1.25-1.5 bar absolute at loads below 2 bar gross IMEP increasing to a value of 2.25 bar absolute at 12 bar gross IMEP load. The specific boost pressure values are plotted in FIG. 2. These boost pressures are easily obtainable by turbocharger systems in current vehicle use today. The inlet temperature was adjusted to keep stable combustion with all the fuels throughout the load sweep. These values are plotted in FIG. 3. To keep NOx below 0.40 g/kWh at the highest load (i.e., 12 bar gross IMEP), from about 35% to about 50% of EGR was used with all the fuels, as shown in FIG. 4. These EGR values are reasonable and feasible with commercial systems being used in vehicles today. The EGR used in this paper is defined as the ratio of carbon dioxide in the intake and exhaust. The exhaust gases were cooled down before being introduced in the intake.

Emission Measurements Systems

The emissions were measured using a Cusson gas analysis system. CO and $CO_2$ were measured by non-dispersive infrared analyzer; $O_2$ was measured with a paramagnetic analyzer; and, total hydrocarbons were measured with a heated flame ionization detector. A chemiluminescent analyzer was used to measure $NO_x$ and the smoke was measured with an AVL 415 opacimeter. Each analyzer was calibrated with an appropriate calibration gas before every set of measurements.

Fuels

Nine fuels having boiling points in the gasoline range (i.e., 95 to 440 degrees Fahrenheit) were tested. The primary properties of those fuels are listed in Table 2.

TABLE 2

Main properties of the fuels tested

| | FUEL BLEND | | | | | | | |
|---|---|---|---|---|---|---|---|---|
| | RON | MON | n-paraffins | iso-paraffins | Naphthenes | Aromatics | olefins | ethanol | Sum of n-paraffins plus naphthenes |
| Comparative Example 1 | 99 | 96.9 | 0.9 | 95.3 | 0.8 | 1.2 | 1.6 | 0 | 1.7 |
| Example 1 | 88.6 | 79.5 | 4.9 | 32.8 | 12.2 | 19.7 | 29.6 | 0 | 17.1 |
| Example 2 | 87.1 | 80.5 | 13.6 | 47.8 | 7.6 | 22.8 | 7.2 | 0 | 21.2 |
| Example 3 | 92.9 | 84.7 | 13.3 | 40.0 | 8.0 | 26.3 | 2.0 | 9.4 | 21.3 |
| Example 4 | 97.7 | 87.5 | 11.9 | 34.6 | 6.4 | 23.8 | 2.1 | 20.5 | 18.3 |
| Example 5 | 70.3 | 65.9 | 4.4 | 45.0 | 32.2 | 11.6 | 0.3 | 0 | 36.6 |
| Example 6 | 69.4 | 66.1 | 33.8 | 35.5 | 5.8 | 18.8 | 5.3 | 0 | 39.6 |
| Example 7 | 78.2 | 73.4 | 28.0 | 37.1 | 6.9 | 25.5 | 1.8 | 0 | 34.9 |
| Comparative Example 2 | 96.5 | 86.1 | 9.6 | 27.8 | 2.1 | 59.4 | 0.5 | 0 | 11.7 |

The nine fuels were tested through a load sweep from 0.5-12.5 bar gross IMEP at engine speeds of 1000 and 1300 rpm. Engine hardware limited the highest load tested. Due to the high reactivity of the fuels Examples 1, 4, 6 and 7, only one injection point was used for those fuels.

Results
Efficiency

Figure 5:
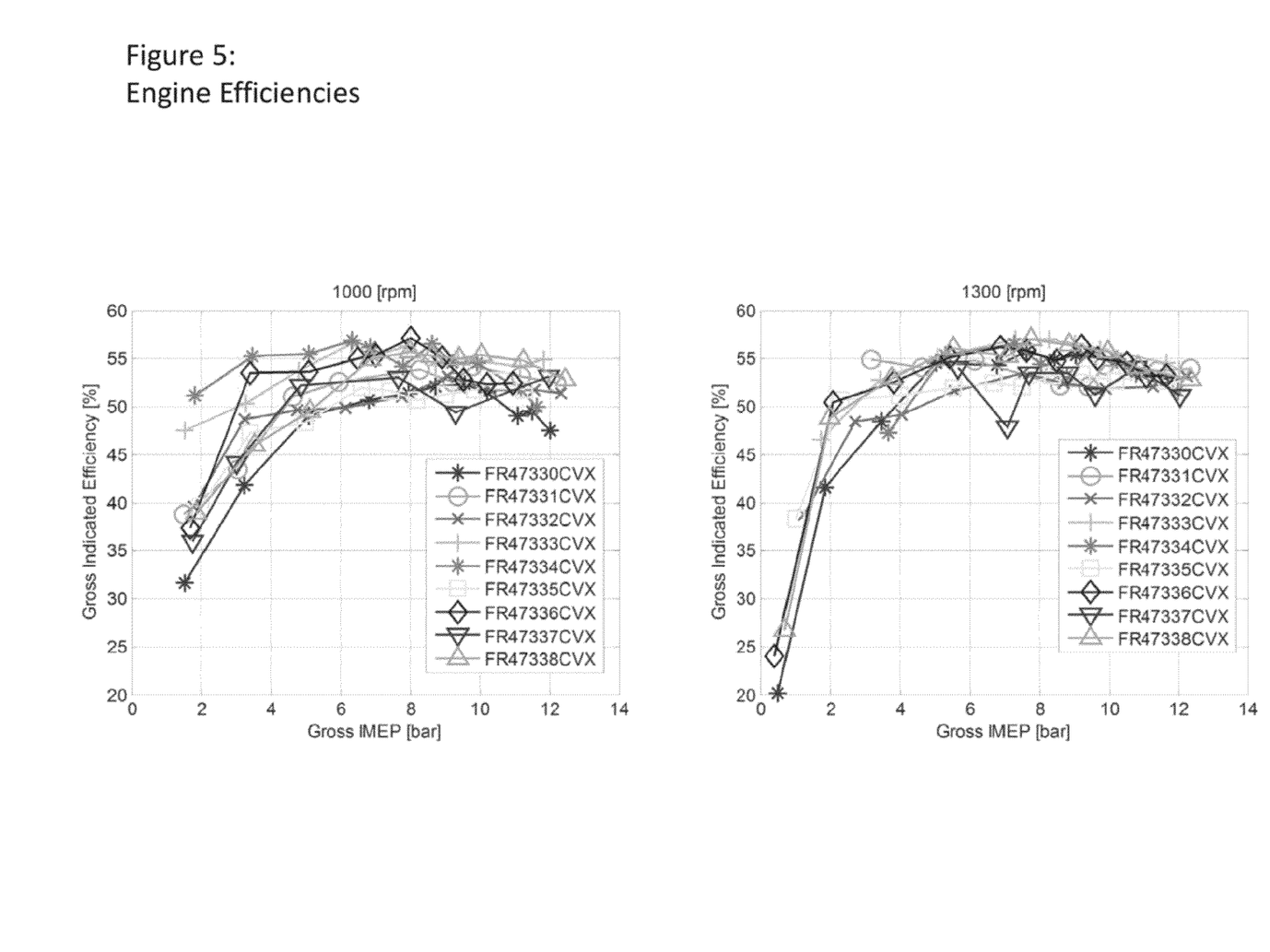
FIG. 5 depicts the engine efficiencies that were obtained with the fuels tested.

The efficiency of the engine (i.e., engine performance) is an important parameter that is dependent upon the fuel employed in the internal combustion engine. The gross indicated efficiency as a function of load for the 9 fuels is plotted in FIG. 5. As depicted in FIG. 5, for loads higher than 2-3 bar gross IMEP efficiency is greater than 49% for all of the fuels. The best efficiencies are significantly higher than those reported by Kalghatgi et. al. and Manente et. al for high octane premium gasoline and diesel fuel.

Efficiency values as high as 57% were obtained. Generally the fuels in our study with the highest gross indicated efficiencies were those in Examples 5, 6, and 7, which were not the highest octane fuels.

Figure 6:
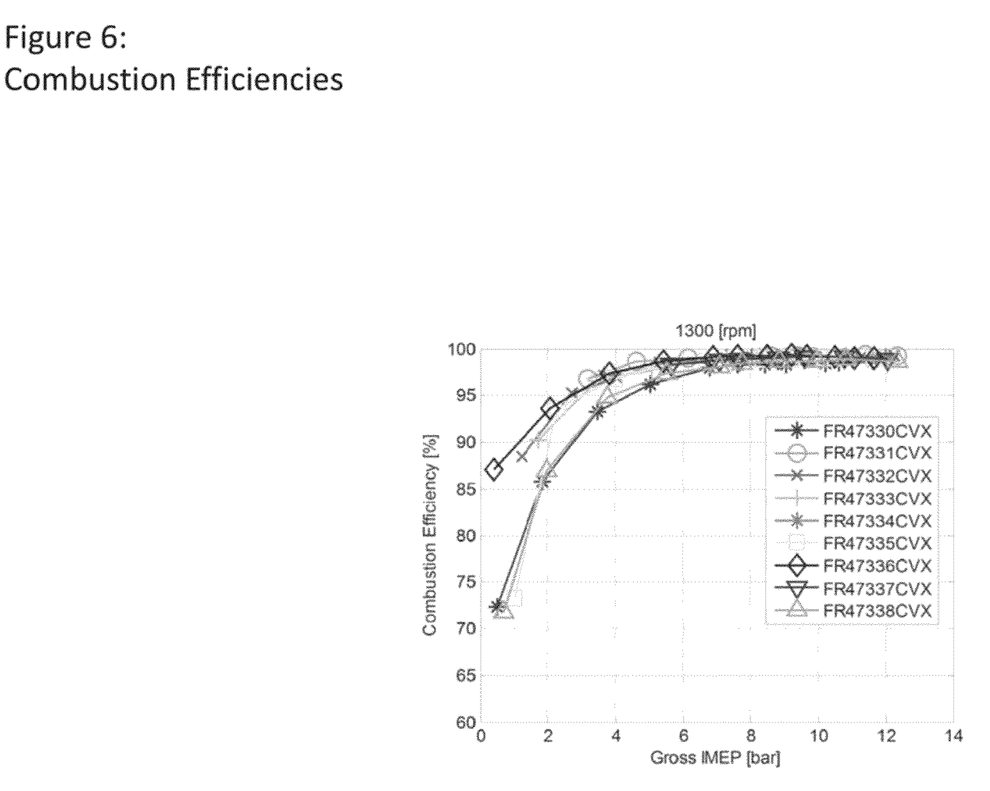
FIG. 6 depicts the combustion efficiencies that were obtained with the fuels tested.

FIG. 6 shows that combustion efficiency was always higher than 97% for loads higher than 5 bar IMEP. This is a remarkable result considering that EGR levels were near 50% at the highest loads and typically efficiency decreases at these conditions.

Emissions

Figure 7:
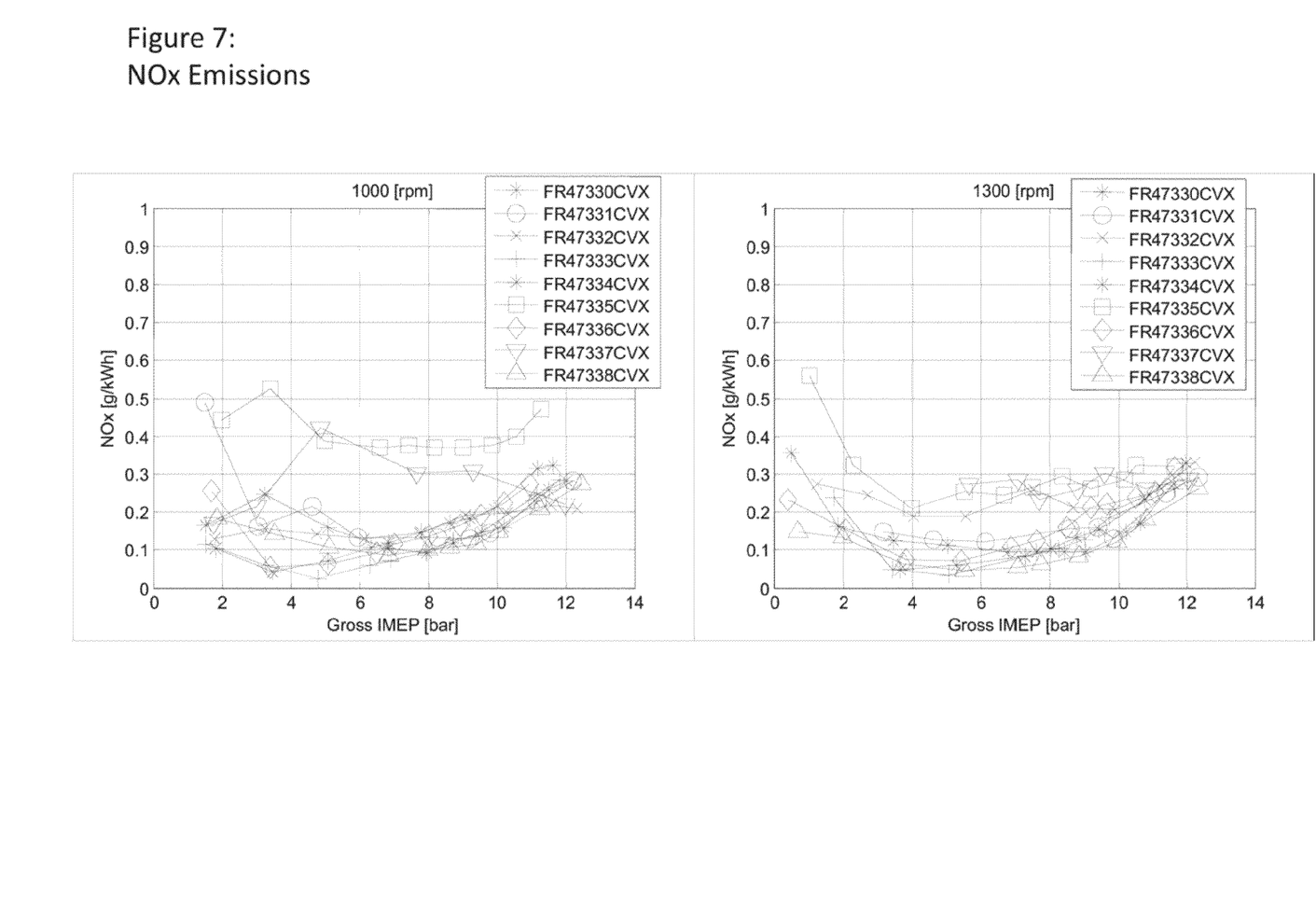
FIG. 7 depicts the engine-out NOx emissions for the fuels tested.

The gross indicated NOx emissions are shown in FIG. 7. 50% EGR and a compression ratio of 18:1 were employed with all the fuels. For the fuels of the invention, these engine operating conditions resulted in very low $NO_x$ levels, below 0.35 g/kWh even at 12 bar gross IMEP. Decreasing the load, NOx decreased as well, namely because of lower combustion temperature in the combustion engine. In some cases, e.g. Example 2, NOx increases at lower load because the emission are plotted relatively to the power, this means that if the efficiency decreases the specific emissions increase.

Figure 8:
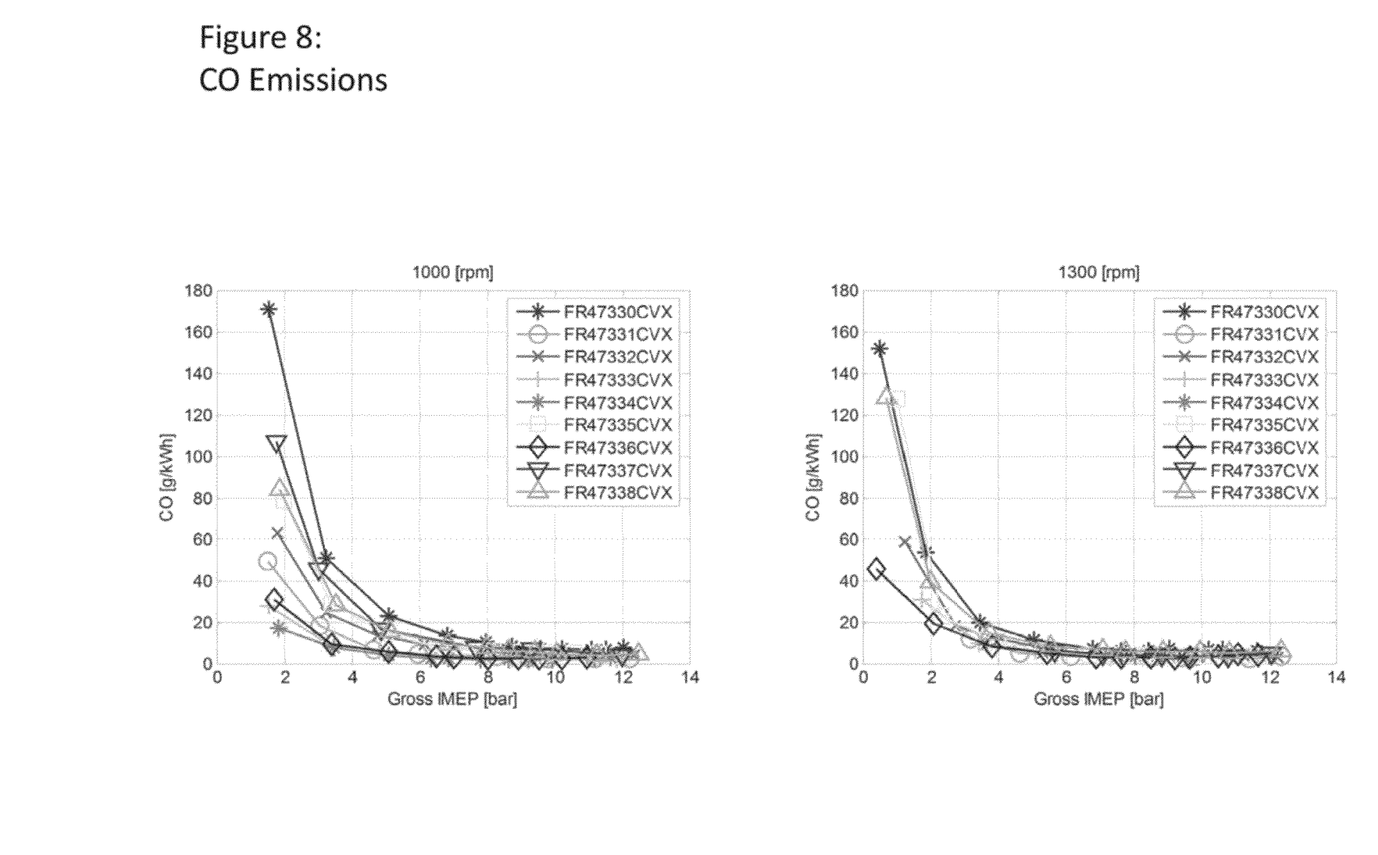
FIG. 8 depicts the engine-out CO emissions for the fuels tested.
Figure 9:
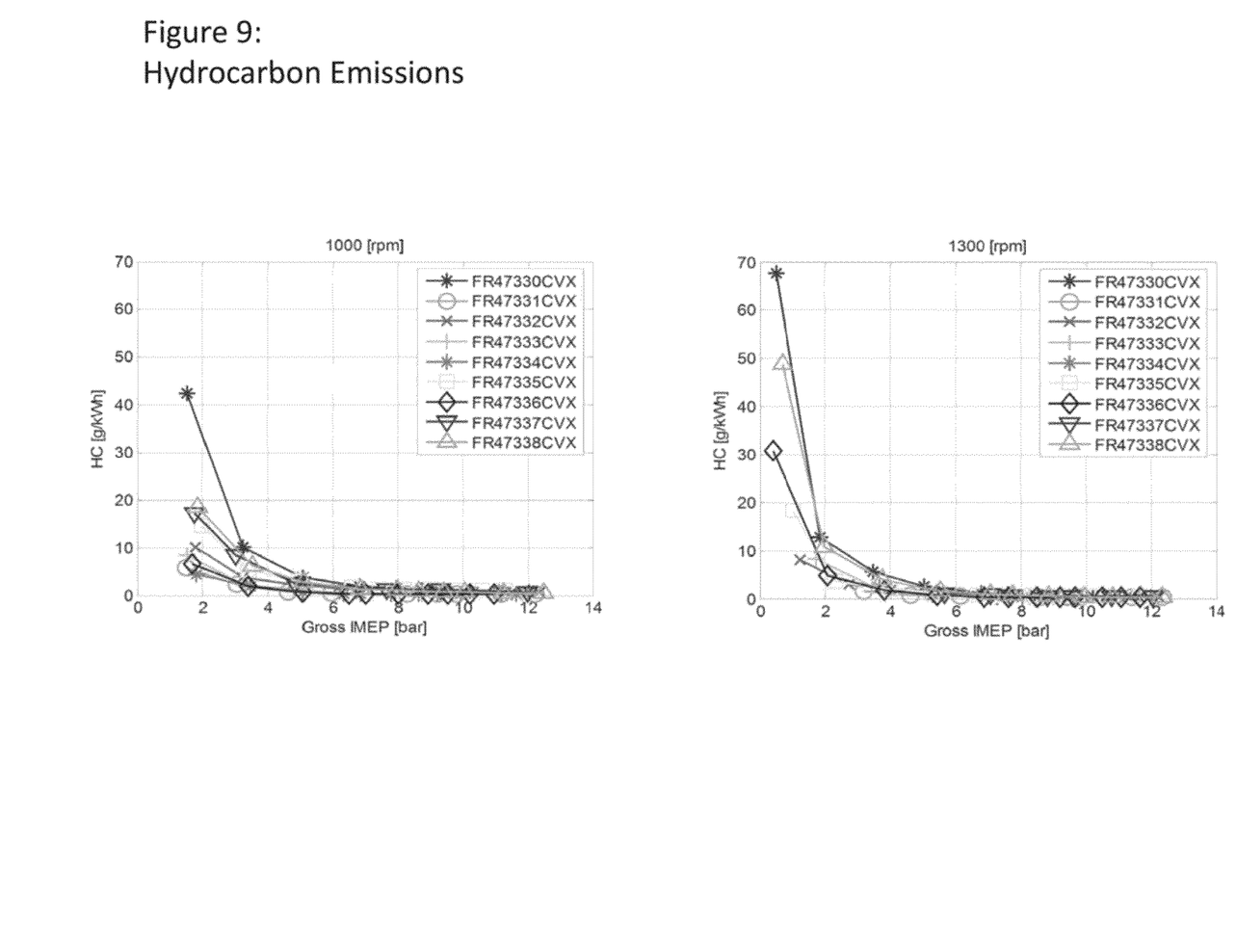
FIG. 9 depicts the engine-out hydrocarbon emissions for the fuels tested.

Because of the high combustion efficiency, low values of CO and HC were obtained for all of the fuels, (see FIG. 8 and FIG. 9 respectively). These values are significantly lower than the values obtained by Kalghatgi et. al. and Manente et. al for premium gasoline and diesel fuel. The low values of CO and NOx obtained, when the fuels of the present invention are employed, indicates that with mid-to-high octane number fuels running in PPC mode that it is possible to burn the fuel-air mixture in the temperature range between 1500 and 2000 [K]. A combustion temperature higher than 1500 [K] is necessary to promote the reactions from CO to CO2; in essence, it is important to keep the combustion temperature below 2000 [K]

Figure 10:
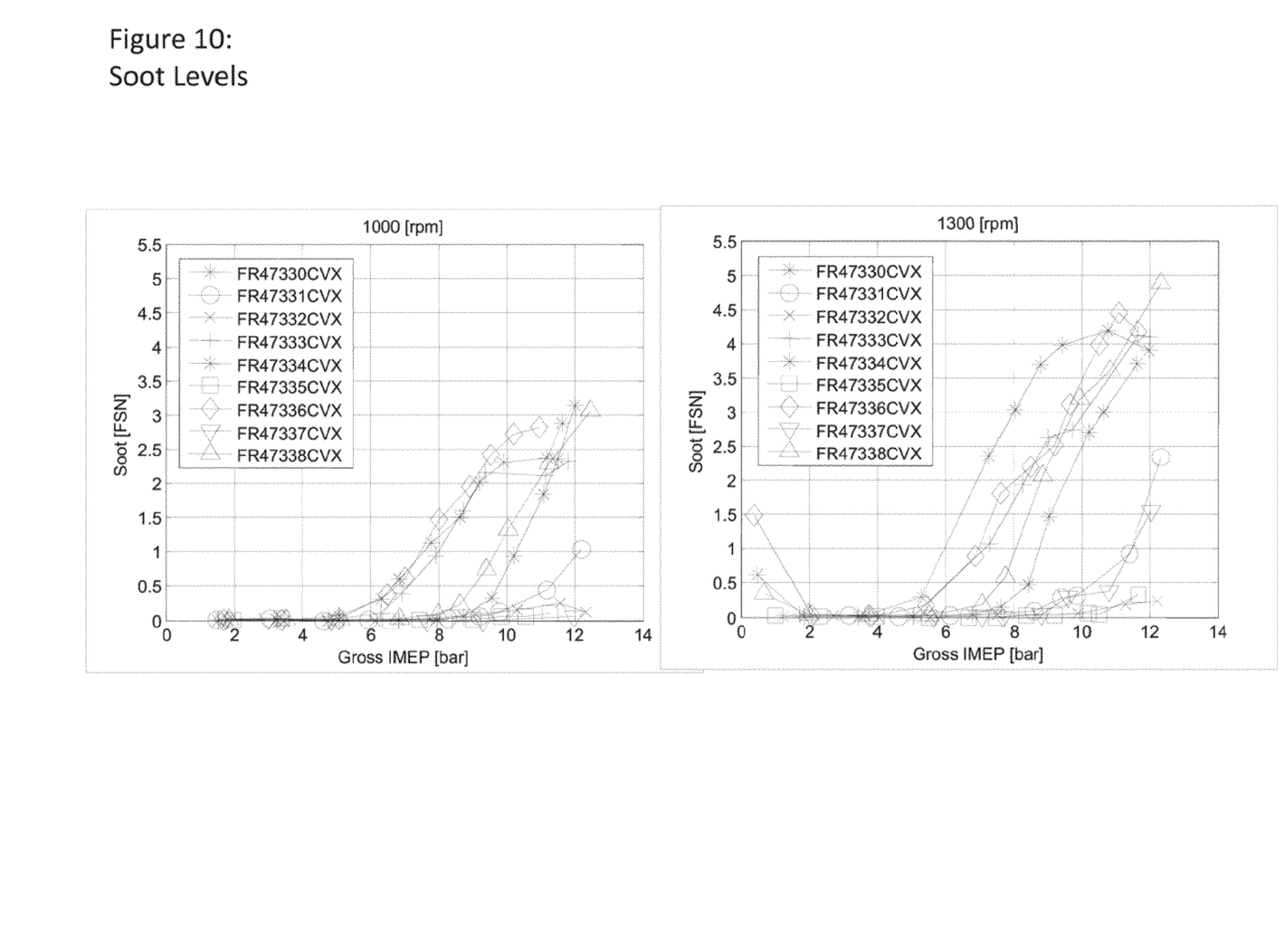
FIG. 10 depicts the soot emissions for the fuels tested.

Soot levels were very low (<1 FSN) for all of the fuels up to a load of about 6 bar gross IMEP. As shown in FIG. 10, as the load increased to 12 bar gross IMEP, the soot levels for the fuels increased to a level between 0.1 and 3.1 FSN at a speed of 1000 rpm and values of 0.2-5 FSN at a speed of 1300 rpm. Employing a different injection system combined with an optimized flow motion would enable much lower soot values. These engine-out values are low enough that common commercial diesel particulate filters can treat further to meet government emission regulations.

The lowest soot values at the highest load point of 12 bar gross IMEP were obtained for the fuels in Examples 4 and Comparative Example 1. Ethanol, because of its molecular structure, had soot below 0.06 FSN.

Engine Noise/Maximum Rate of Pressure Rise

Figure 11:
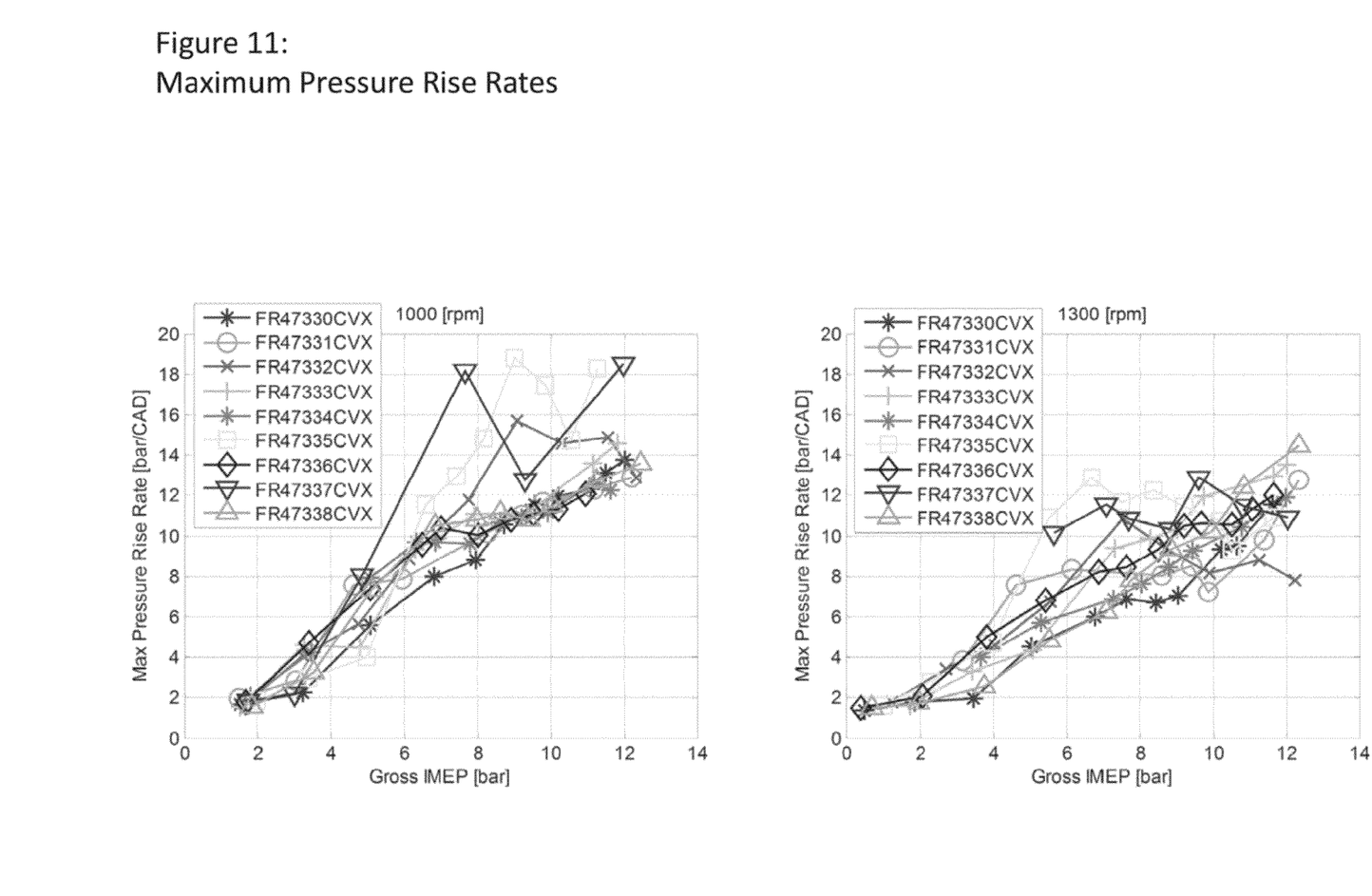
FIG. 11 depicts the in cylinder maximum pressure rise rates obtained for the fuels tested.
Figure 12:
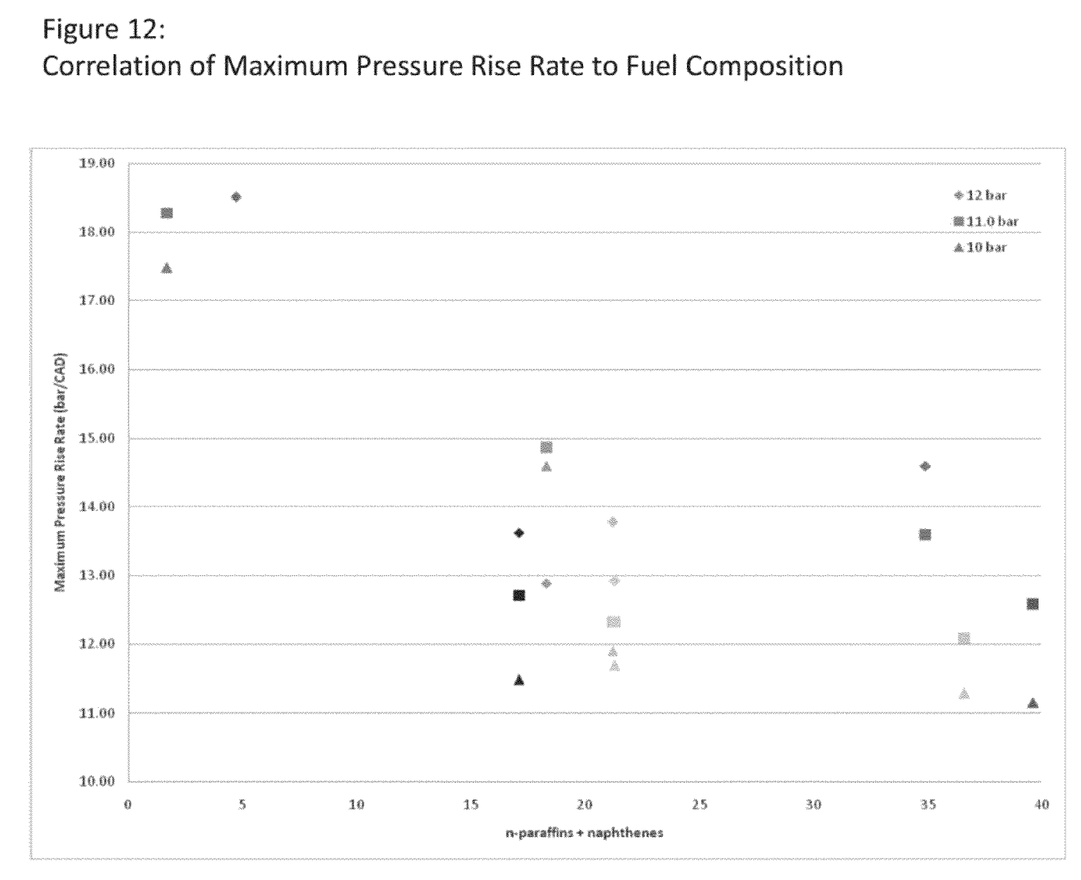
FIG. 12 depicts the correlation we have discovered between maximum pressure rise rates and fuel composition.

One of the key challenges of advanced combustion systems such as partially premixed combustion and HCCI at high load is the maximum pressure rise rate which relates to the engine acoustic noise and potential engine damage. The operating ranges of previous studies are limited to moderate loads due to unacceptable levels of maximum pressure rise rate and engine noise. The maximum pressure rise rates in the current study are plotted in FIG. 11 as a function of load. For heavy duty engines, maximum pressure rise rates of 15 bar/CAD or lower are reasonable. We have found that the maximum pressure rise rates appear to correlate with the properties of the fuels, as shown in FIG. 12 where the rates vs. the sum total of n-paraffins plus naphthenes content are plotted. We have discovered that fuels having a sum total of n-paraffins plus naphthenes content of 7 volume % or higher provide acceptable pressure rise rate (i.e., less than 15 bar/CAD). The poorest performing fuels with pressure rise rates above 17 bar/CAD were Comparative Examples 1 and 2. These fuels are the two fuels that had a sum total of n-paraffins plus naphthenes content less than 7 volume %.

Thus we have discovered that reasonable pressure rise rates (along with high gross efficiency and very low NOx emissions) can be obtained over a wide range of load conditions in advanced combustion, especially in partially premised combustion settings using gasoline-type fuels containing more than 7 volume % of a sum total of n-paraffins plus naphthenes.

What is claimed is:

1. A method of operating an internal combustion engine comprising,
   i. employing a fuel composition in an internal combustion engine, wherein the fuel composition has (a) a boiling range of between 95 to 440 degrees Fahrenheit, wherein the fuel composition has (b) total sum of n-paraffins and naphthenes content of 7 volume percent or higher and (c) wherein the RON is about 93 or less;
   ii. operating, the internal combustion engine, wherein the compression ratio is from about 16:1 to about 20:1 and wherein the internal combustion engine is operated under partially premixed combustion conditions;
   iii. wherein the fuel composition is employed at a load of at least up to 12 bar gross IMEP and engine out NOx emissions are no more that 0.35 grams/kilowatt-hr, and
   iv. wherein the exhaust gas recirculation rate is less than 60 volume percent.

2. The method of claim 1 wherein the internal combustion engine has a gross efficiency greater than 50%.

3. The method of claim 1 wherein the internal combustion engine has a maximum pressure rise rate of less than about 17 bar/crank, angle degrees.

4. The method of claim 3 wherein the maximum pressure rise rate is less than about 15 bar/CAD.

5. The method of claim 4 wherein the maximum pressure rise rate is less than about 13 bar/CAD.

6. The method of claim 2 wherein the internal combustion engine is operated wherein the exhaust gas recirculation is less than 55 volume percent.

7. The method of claim 2 wherein the engine out NOx emissions are no more than 0.3 grams/kilowatt-hr.

8. The method of claim 2 wherein the fuel composition is employed at a load up to 12 bar gross IMEP.

9. The method of claim 2 wherein the internal combustion engine is operated at a compression ratio of from about 17:1 to about 19:1.

10. The method of claim 9 wherein the internal combustion engine is operated at a compression ratio of 18:1.

* * * * *